Dec. 15, 1970   G. A. G. IVE   3,548,201
MACHINE GUARDS

Filed Aug. 8, 1968                                2 Sheets-Sheet 1

INVENTOR
Goodwin Alfred George IVE
BY Sparrow & Sparrow
ATTORNEYS

Dec. 15, 1970  G. A. G. IVE  3,548,201
MACHINE GUARDS

Filed Aug. 8, 1968  2 Sheets-Sheet 2

INVENTOR
Goodwin Alfred George IVE
BY Sparrow & Sparrow
ATTORNEYS

United States Patent Office 3,548,201
Patented Dec. 15, 1970

3,548,201
MACHINE GUARDS
Goodwin A. G. Ive, Old Chipstead, England, assignor of one-half to Radiovisor Parent Limited, London, England
Filed Aug. 8, 1968, Ser. No. 751,224
Claims priority, application Great Britain, Aug. 10, 1967, 36,709/67
Int. Cl. G08b 13/10
U.S. Cl. 307—116                                    13 Claims

ABSTRACT OF THE DISCLOSURE

A machine guard operating in accordance with "safety by distance" principles and including a pneumatic operable contact mat having inlet and outlet ports, the inlet port being connected to a source of air pressure via an air valve and the outlet port being connected to the input of a variable air type flow meter having a float whose level is determined by the air flow through the contact mat, photoelectric sensing means for detecting the level of the float such as to produce an electrical signal whenever the level of the float falls below a predetermined level, and control means connected in a control circuit of the machine or machine component and responsive to the electrical signal from the sensing means such as to immobilise the machine or machine component, the control means being of the fail-safe type.

---

This invention relates to machine guards and particularly to a system and apparatus for guarding a machine in accordance with the well-known principle of "safety by distance." With machine guards employing such a principle, the operator is required to move a predetermined distance from the machine before the machine can be operated. If the operator moves into the prohibited area, the safety requirements are such that the machine will be immobilised immediately and only the performance of a deliberate control operation is capable of re-starting the machine, machine cycle or protected components of the machine.

Heretofore, photoelectric machine guards have been proposed and used, but in order to ensure that an operator cannot enter or place part of his body within the prohibited area, it is necessary to provide a large number of light beams and photocells so spaced as to prevent any person from advancing to within less than a predetermined distance of the machine without actuation of the machine cut-off and control mechanism. However, the provision of such plurality of light beams and photocells is relatively complex and costly and an object of the present invention is to provide a machine guard which is far less costly than that necessary to adequately protect a machine using photocell techniques.

A more specific object of the invention is to provide a machine guard including a contact mat and arranged to immobilise a machine virtually instantaneously immediately a person such as a machine operator steps into a prohibited zone.

According to the present invention there is provided a machine guard operating in accordance with "safety by distance" principles and including a contact mat having a size determined by the dimensions of the prohibited area and fail-safe control means responsive to pressure exerted on the mat, to immobilise the machine or any selected component thereof such as to require a separate control operation to be performed in order to cause the machine or said component thereof to become re-operative.

In a preferred embodiment of the invention the contact mat is of the pneumatic type and is placed adjacent the machine to span the prohibited area, such that any person imparting pressure to the mat by standing thereon would immobilise the machine or selected component thereof via suitable pneumatically-actuated control means.

Preferably filtered air from a suitable supply source is supplied under pressure to the contact mat (the constructional features of which will be hereinafter described) via an electromagnetically operated air valve. The air enters the mat via an inlet port and an outlet port of the mat is connected to a flow meter of the variable area type.

The flow meter consists of a vertical transparent tube of glass or plastics materials containing a float, the level of which within the tube is determined by the rate of air flow. The position of the float within the tube is monitored by a photoelectric sensing device preferably comprising a light source located on one side of the tube and arranged to project a beam of light through the tube onto a photocell located on the opposite side of the tube.

Thus, if the air flow through the mat is interrupted by a person standing or setting foot thereon, the float in the tube of the flow meter will fall causing energisation or momentary de-energisation of the photocell, according to the particular circuit arrangement of the flow meter. The change in state of the photocell is used to effect the energisation or de-energisation of an electrical relay having associated contacts, connected in circuit with the solenoid of the electromagnetically operated air valve, and further contacts connected in the control circuit of the machine or machine component.

Actuation of the contacts in response to the energisation or de-energisation of the relay immobilises the machine or machine component and the relay, once tripped, may be arranged to be held in the latched position so that no air passes through the mat until the relay is reset. With the relay in the tripped position, the machine or machine component is immobilised and cannot be rendered re-operative until the relay is reset. A feature of the present invention is that resetting of the relay to render the machine or component re-operative can only be performed by means of a deliberately intended operation and preferably by actuation of a push button or foot pedal to effect actuation of associated starter switch contacts in the starting control circuit of the machine or component. Actuation of the starter control is arranged to restore the air flow through the air valve, contact mat and flow meter allowing the float to rise in the tube and effect de-energisation or energisation of the photocell thus actuating the contacts in the electrical relay circuit and resetting the relay allowing the machine to continue operation or the component to be rendered re-operative.

With such a machine guard, it is imperative that the arrangement is "fail-safe" and this is achieved by the particular arrangement of relay, contact mat, flow meter and air valve and associated electrical and pneumatic circuitry used in the present invention. However, to guard against an "unsafe failure condition," an automatic check may be built into the system. A preferred arrangement is to provide switch contacts in the machine control circuit arranged to be actuated, i.e. make or break, on each return stroke of a component of the machine such as a ram or the blade of a guillotine, or once during each cycle of a rotating component or tool. Each time the contacts are actuated, for a predetermined timing period the air valve is arranged to be changed to a cut-off or to an exhaust condition such that the float of the view meter falls thereby energising or de-energising the control relay as previously described and within the said time period to simulate interruption of the air supply to the mat by pressure exerted thereon. If the relay fails to be actuated during the time period of the automatic checking switch, a second relay is arranged to be actuated and via associated contacts in the control circuit of the machine or component, effect interruption of the machine. The second relay may be latched in the cut-out condition and also effect operation of a visual or audible warning device to indicate to the operator that an unsafe condition has occurred.

The relay may be manually reset and may require a special key or tool normally retained in the possession of an authorized person only. Thus, should an "unsafe" fault condition occur, the machine remains immobilised until inspection and repair has been effected by a responsible operator.

If necessary an over-ride control may be installed in the system such that a person may stand on the contact mat and a component or tool on the machine may be changed, without actuation of the machine guard mechanism and circuitry. For this purpose, a special removable key may be provided for operation of a key switch; the key being kept in the possession of a duly authorised person and removal of the key from the key switch restoring the machine guard mechanism to its operative state. If necessary, whenever the machine guard mechanism is rendered inoperable for any reason, such as by insertion of the over-ride key, a circuit may be completed to a visual indicator such as a lamp or sign to provide a visual indication to an operator that the machine guard mechanism is inoperative and extra care must be exercised when setting up the machine or operating the same.

The contact mat may be of any required shape, configuration or construction and formed from any suitable material such as rubber, plastics or other flexible or resilient material capable of retaining fluid under pressure and sustaining a reasonable weight or pressure applied thereto without rupture. Preferably, the mat comprises a pair of sheets of plastics material placed together to form a sealed envelope and having a continuous channel of serpentine configuration extending throughout the enclosed area. One end of the channel is connected to the electro-magnetically operated air valve and the outlet end of the channel is connected to the flow-meter tube as hereinbefore described such that interruption of the air flow causes collapse of the float in the tube of the flow meter. To protect the plastics sheeting the plastics envelope may be overlaid with a layer of rubber or like wear-resistant material.

The mat may be of any suitable shape and may be formed of flexible tubing if necessary or divided into a number of discrete or interconnected compartments.

It will be appreciated that the arrangement described operates upon interruption of the air flow through the mat and thus should the mat rupture or puncture for any reason, the control circuit will be actuated to interrupt the operation of the machine or component.

If necessary, in order to provide additional protection, the contact mat may be used in conjunction with one or more photocells and associated light projectors and said one or more photocells may be connected in circuit with the photocell of the flow meter. Such an arrangement would prevent a person from leaning across the mat without treading thereon to reach the machine or component, thus entering the prohibited area, and would give similar protection to that provided by a horizontal photocell machine guard employing a large number of light beams, but at a fraction of the cost and with far less complex mechanism.

Although the invention has been particularly described with reference to a contact mat of the pneumatic type i.e. employing air as the fluid medium, it will be appreciated that any type of contact mat may be used, although a pneumatic type mat would appear to provide maximum "fail-safe" facilities and also, as described, automatic checking may be provided as a built-in feature of the system.

However, an electric type contact mat may be used wherein two members are brought into contact in response to pressure, such as the weight of a person or the pressure exerted by a person stepping onto the contact mat, the contact of such members effecting closure of an electric circuit associated with the control circuit of the machine or machine component to cause the machine or component to be immobilised as hereinbefore described in connection with a pneumatic type contact mat.

Alternatively, a hydraulic type mat may be employed. Instead of connecting the inlet port of the contact mat to an air supply, the port may be connected to a source of liquid pressure supply. A flow meter is used to monitor the liquid flow and in principle, the hydraulic system would be similar to that employed for the pneumatic type contact mat. If necessary, a recirculating pump could be employed so that no liquid is wasted.

Alternatively, the liquid would be supplied via the contact mat to a measuring gauge, the height of the liquid in the gauge being determined by the head of the liquid. Immediately any pressure is exerted on the contact mat, the liquid will be displaced in the tube of the gauge and as with the flow meter and float arrangement, the movement of the liquid is detected by a photocell or similar sensing device such as to provide an indication of the pressure exerted on the mat.

It will be appreciated that the invention is susceptible of considerable modification and is not to be deemed limited to the particular arrangement described by way of example only. Preferred embodiments illustrated by way of example only are illustrated in the accompanying drawings wherein.

Figure 1:
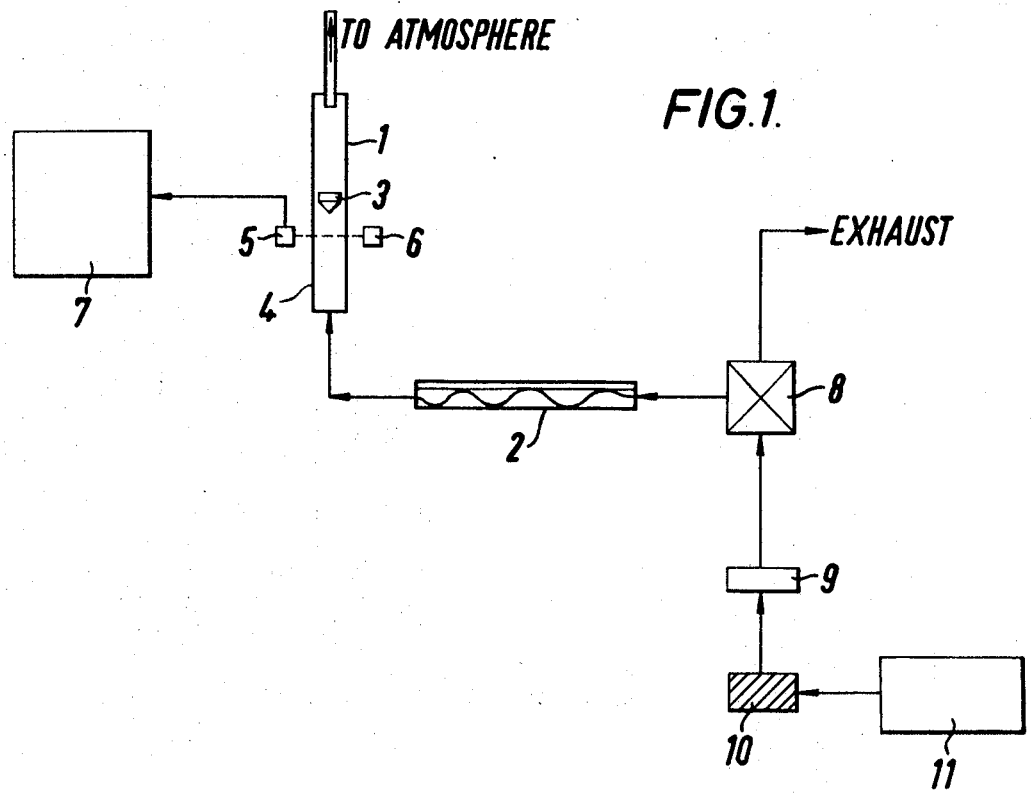
FIG. 1 is a schematic block diagram of a pneumatic mat circuit.

Referring to FIG. 1 there is provided a pneumatic contact mat arrangement employing a flow meter 1 having the inlet thereof connected to the outlet port of a contact mat 2; the flow meter being provided with a float 3, the position of which within the tube 4 is arranged to be monitored by a photoelectric sensing device comprising a photocell 5 and associated light source 6.

The output of the photocell is connected to a control unit 7 for the machine or component and comprising a relay and associated contacts (not shown) as previously described. The flow meter tube 4 is connected to atmosphere as shown and the input port of the contact mat 2 is connected to the electromagnetically operated air valve 8 connected via a pressure regulator 9 and filter unit 10 to an air supply source 11. The operation of the circuit shown in FIG. 1 is substantially as hereinbefore described and an automatic checking device may be incorporated in the system if necessary.

Figure 2:
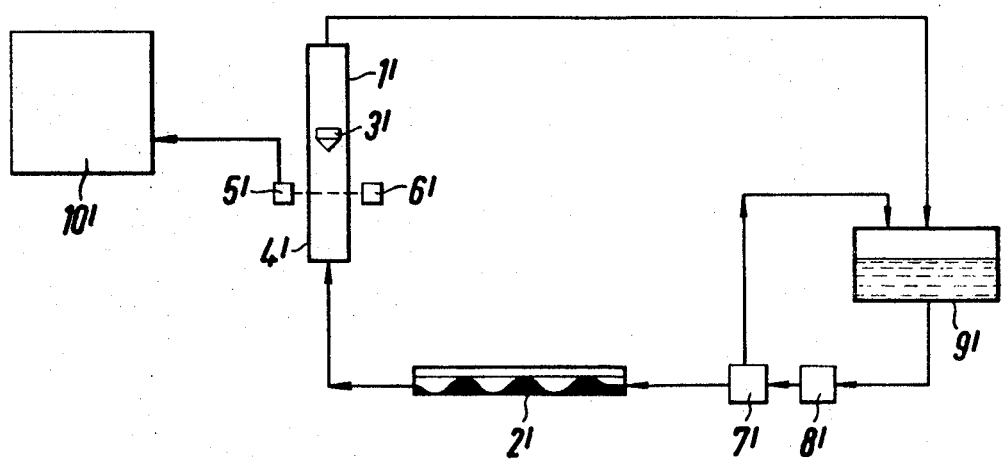
FIG. 2 is a schematic block diagram of an hydraulic system.

Referring to FIG. 2, the pneumatic contact mat of FIG. 1 is replaced by an hydraulic contact mat 2' connected to a flow meter 1' having float 3' and associated photocell 5' and light source 6'. The input port of the mat 2' is connected via a valve 7' to a pump 8', the valve 7' and pump 8' being connected to a reservoir 9' and the outlet of the flow meter 1' also being returned to the reservoir 9'. The control relay and associated contacts and control circuitry are depicted by block 10'.

Figure 3:
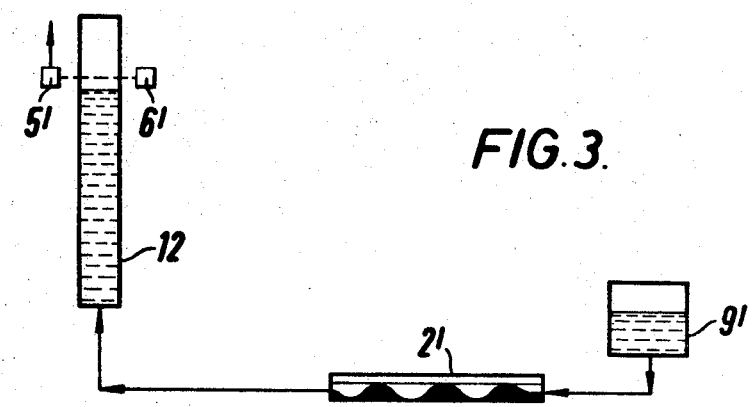
FIG. 3 is a simplified hydraulic system.
Figure 4:
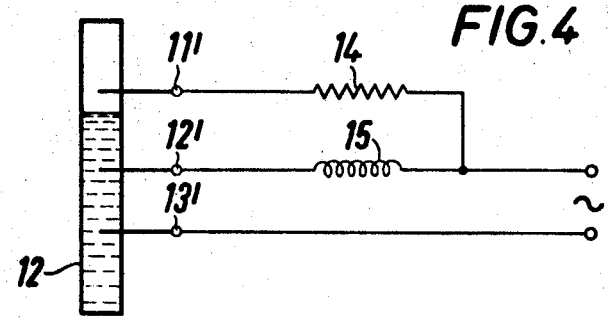
FIG. 4 is a diagram wherein the gauge is provided with contact members located within the tube.

As shown in FIG. 3 a liquid pressure gauge 12 replaces the flow meter 1'.

Instead of the photocell and light source arrangement of the preceding hydraulic arrangement, the gauge tube may be provided with contacts 11', 12', 13' associated with the liquid and connected to a source of AC potential to provide an indication of the level of the liquid in the tube of the gauge. When the liquid is in a static state, the contacts 12' and 13' are shorted via the liquid to energise the associated relay 15. Pressure on the hydraulic contact mat causes displacement of the liquid which rises in the relatively small bore tube of the gauge 12. The contacts 11', 12', effectively shunt the relay 15 to effect de-energization thereof. If, for any reason, sufficient liquid escapes to lower the level in the tube below that of contact 12' the relay 15 will also become de-energised and the associated relay contacts open to open the control circuit of the machine or component to immobilise the same as previously explained.

Figure 5:
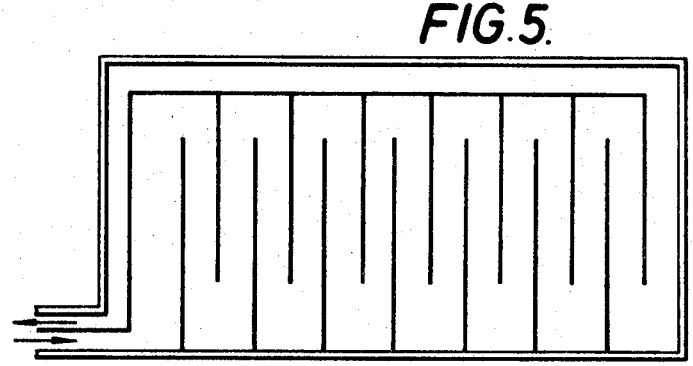
FIG. 5 illustrates a paln view of a particular contact mat configuration.

A plain view of one form of contact mat is shown in FIG. 5 showing the inlet port 30 and the continuous channel 31 formed between adjacent planar surfaces formed of rubber, plastics or other flexible material. The air passes around the channel as indicated by the dotted lines and emerges via outlet port 32. Although the channel is of angular form it will be appreciated that as previously indicated, the channel may preferably be of serpentine form with rounded contours to reduce the possibility of rupture of the seams of welds to a minimum.

What I claim is:

1. A guard for a machine, said guard operating in accordance with "safety by distance" principles, said guard comprising a pneumatic type contact mat having a size determined by the dimensions of the prohibited area, said mat having inlet and outlet ports, means for supplying air under pressure to said inlet port, and fail-safe control means responsive to pressure exerted on the mat for immobilizing said machine, said control means comprising a flow meter, said outlet ports connected to said flow meter.

2. A machine guard as claimed in claim 1 wherein said flow meter is of the variable area type having a float whose level is determined by the air flow through said contact mat, sensing means for detecting the level of said float, said means producing an electrical signal whenever the level of said float falls below a predetermined level, and control means connected in a control circuit of said machine, said control means responsive to said electrical signal for immobilizing said machine.

3. In a machine guard as claimed in claim 2, said mat including electrical contacts arranged to be connected together in response to pressure applied to said mat, and said contacts being connected in circuit with said control circuit of said machine for effecting immobilization thereof whenever pressure is applied to said mat.

4. A machine guard as claimed in claim 2 wherein said sensing means includes a light source arranged to direct light onto a photoelectric cell whenever the level of said float falls below said predetermined level, said cell producing said electrical signal, and said control means including an electrical control relay having associated contacts therein connected in circuit with a solenoid of said air valve and having further associated contacts therein connected in said control circuit of said machine.

5. A machine guard as claimed in claim 4 wherein said relay has means associated therewith to hold said relay in a latched position after tripping so that no air passes through said mat until said relay is reset.

6. A machine guard as claimed in claim 5 and further including switch contacts arranged to be actuated during each stroke or cycle of said machine for effecting actuation of said air valve and of said flow meter at each stroke or cycle, and a further electrical relay having associated contacts connected in said control circuit of said machine, said further relay being rendered operative whenever said control relay fails to operate, for interrupting operation of said machine in the event of an unsafe failure condition.

7. A machine guard as claimed in claim 4 and further including switch contacts arranged to be actuated during each stroke or cycle of said machine for effecting actuation of said air valve and of said flow meter at each stroke or cycle, and a further electrical relay having associated contacts connected in said control circuit of said machine, said further relay being rendered operative whenever said control relay fails to operate, for interrupting operation of said machine in the event of an unsafe failure condition.

8. A machine guard as claimed in claim 7 including warning means for providing an indication of the occurrence of said unsafe failure condition.

9. In a machine guard as claimed in claim 1 said mat including an envelope of elastomeric material, said mat having a continuous channel formed therein of serpentine configuration and having inlet and outlet ports for connection to said air valve and to said flow meter, respectively.

10. In a machine guard as claimed in claim 1 said mat including electrical contacts arranged to be connected together in response to pressure applied to said mat, and said contacts being connected in circuit with said control circuit of said machine for erecting immobilization thereof whenever pressure is applied to said mat.

11. A contact mat for the machine guard as claimed in claim 1 having inlet and outlet ports, means for supplying fluid under pressure to said inlet port and said outlet port being connected to said flow meter to monitor the fluid flow through said meter.

12. A contact mat for the machine guard as claimed in claim 1 having inlet and outlet ports, means for supplying fluid under pressure to said mat via said inlet port and a measuring gauge, said fluid being supplied via said mat to said measuring gauge, the height of said fluid in said gauge being determined by the head of said fluid, and sensing means for detecting any fall in the level of said fluid in said gauge below a predetermined level for providing an indication of pressure exerted on said mat.

13. A guard for machine, said guard operating in accordance with "safety by distance" principles, said guard comprising a pneumatic type contact mat having a size determined by the dimensions of the prohibited area, said mat having inlet and outlet ports, means for supplying air under pressure to said inlet port, and fail-safe control means responsive to pressure exerted on the mat for immobilizing said machine, said control means comprising a pressure gauge, said outlet ports connected to said pressure gauge.

References Cited

UNITED STATES PATENTS

| | | | |
|---|---|---|---|
| 984,587 | 2/1911 | Meier | 340—267 |
| 2,466,355 | 4/1949 | Baker | 340—419 |
| 2,555,346 | 6/1951 | Larsen | 192—133 |
| 2,644,546 | 7/1953 | Doolan | 340—272X |
| 3,445,835 | 5/1969 | Fudaley | 340—258 |

ROBERT K. SCHAEFER, Primary Examiner

T. B. JOIKE, Assistant Examiner

U.S. Cl. X.R.

192—129; 340—272, 419